US00RE49021E

(19) United States
(12) Reissued Patent
Chiang et al.

(10) Patent Number: US RE49,021 E
(45) Date of Reissued Patent: Apr. 12, 2022

(54) CASE FOR AN ELECTRONIC DEVICE

(71) Applicant: Speculative Product Design, LLC, San Mateo, CA (US)

(72) Inventors: Randy Yang Chiang, San Mateo, CA (US); Alan Yu Tung Ng, San Francisco, CA (US); Bryan Lee Hynecek, Redwood City, CA (US); Jon Karl Dukerschein, San Francisco, CA (US); Eric Frasch, San Francisco, CA (US); On Yu Wu, Oakland, CA (US)

(73) Assignee: Speculative Product Design, LLC, San Mateo, CA (US)

(21) Appl. No.: 29/651,114

(22) Filed: Apr. 29, 2020

Related U.S. Patent Documents

Reissue of:
(64) Patent No.: Des. 816,651
Issued: May 1, 2018
Appl. No.: 29/568,292
Filed: Jun. 16, 2016

(51) LOC (13) Cl. ..... 14-03
(52) U.S. Cl.
USPC ..... D14/250
(58) Field of Classification Search
USPC ..... D3/201, 218, 226, 227, 247, 249, 250, D3/269, 303; D13/103, 107, 108, 119; D14/137, 138 R, 138 AA, 138 C, 138 G, D14/172, 192, 203.3–203.7, 217, 238.1, D14/247, 248, 250–253, 440, 447
CPC ..... A45C 1/06; A45C 2011/002; A45C 11/00; A45F 2005/028; A45F 2200/0525; H04B 1/3888; H04M 1/0202; H04M 1/0283
See application file for complete search history.

(56) References Cited

U.S. PATENT DOCUMENTS

D475,696 S 6/2003 Hussaini et al.
D574,146 S 8/2008 Eisenbraun
D587,896 S * 3/2009 Aipa ..... D3/201
D610,807 S * 3/2010 Bau ..... D3/269
D638,007 S * 5/2011 Chang ..... D14/250
D646,264 S * 10/2011 Dong ..... D14/250
D647,517 S * 10/2011 Fathollahi ..... D14/250
D648,332 S 11/2011 Kim et al.
D650,776 S * 12/2011 Bau ..... D14/250
D652,825 S * 1/2012 Bau ..... D14/238.1
D659,691 S * 5/2012 Kim ..... D14/250
8,204,561 B2 6/2012 Mongan et al.
D670,912 S * 11/2012 Bau ..... D3/303
D688,233 S * 8/2013 Dong ..... D14/250
D690,688 S 10/2013 Bau
D696,865 S 1/2014 Morszeck
D706,255 S * 6/2014 Akana ..... D14/250
D707,215 S * 6/2014 Weller ..... D14/250
D707,670 S * 6/2014 Chang ..... D14/250
D709,484 S 7/2014 Yoo
D716,281 S * 10/2014 Melanson ..... D14/250
D716,282 S * 10/2014 Melanson ..... D14/250
D716,284 S * 10/2014 Melanson ..... D14/250
D716,783 S * 11/2014 Loncar ..... D14/250
D717,779 S * 11/2014 Dong ..... D14/250
D718,048 S 11/2014 Hsu
D718,756 S * 12/2014 Barfoot ..... D14/250
D721,360 S * 1/2015 Laffon de Mazieres .... D14/250
D724,067 S * 3/2015 Fathollahi ..... D14/250
D726,170 S * 4/2015 Ng ..... D14/250
D729,252 S * 5/2015 Smith ..... D14/440
D729,255 S * 5/2015 Kilkenny ..... D14/440
D734,760 S 7/2015 Brunner et al.
D746,801 S * 1/2016 Pan ..... D14/250
D747,707 S * 1/2016 Roberts ..... D14/250
D747,708 S * 1/2016 Roberts ..... D14/250
D753,641 S * 4/2016 Roberts ..... D14/250
D754,651 S * 4/2016 Roberts ..... D14/250
D754,652 S * 4/2016 Roberts ..... D14/250
D756,344 S * 5/2016 Roberts ..... D14/250
D756,345 S * 5/2016 Roberts ..... D14/250
D757,702 S * 5/2016 Kanazawa ..... D14/250
D757,704 S * 5/2016 Roberts ..... D14/250
D762,200 S * 7/2016 Pan ..... D14/250
D762,201 S * 7/2016 Tseng ..... D14/250
D762,202 S * 7/2016 Tseng ..... D14/250
D763,840 S * 8/2016 Hwang ..... D14/250
D769,233 S * 10/2016 Qian ..... D14/250
D771,607 S * 11/2016 Kim ..... D14/250
D772,854 S * 11/2016 Igarashi ..... D14/250
D775,615 S * 1/2017 Tien ..... D14/250
D776,105 S 1/2017 Han
D778,271 S * 2/2017 Stump ..... D14/250
D780,738 S * 3/2017 Barfoot ..... D14/250
D789,347 S 6/2017 Zamudio

| | | | | | |
|---|---|---|---|---|---|
| D809,454 | S | | 2/2018 | Zhou et al. | |
| D811,412 | S | | 2/2018 | McCurdy | |
| D812,600 | S | * | 3/2018 | Altaras | D14/250 |
| D812,619 | S | * | 3/2018 | Altaras | D14/440 |
| D816,651 | S | * | 5/2018 | Chiang | D14/250 |
| 10,084,502 | B2 | | 9/2018 | Gandhi et al. | |
| 10,383,416 | B2 | | 8/2019 | Hynecek et al. | |
| D861,665 | S | | 10/2019 | Li | |
| D868,765 | S | | 12/2019 | Batta | |
| D879,104 | S | | 3/2020 | Li | |
| D881,895 | S | | 4/2020 | Liu | |
| D889,451 | S | * | 7/2020 | Chiang | D14/250 |
| D889,453 | S | | 7/2020 | Hynecek et al. | |
| D896,212 | S | | 9/2020 | Wang | |
| D912,035 | S | | 3/2021 | Lee | |
| 2009/0107661 | A1 | * | 4/2009 | Andersson | F28D 9/005 165/168 |
| 2010/0203931 | A1 | | 8/2010 | Hynecek et al. | |
| 2015/0119118 | A1 | * | 4/2015 | Ashley | H04M 1/04 455/575.8 |
| 2018/0332939 | A1 | | 11/2018 | Chiang et al. | |
| 2019/0081299 | A1 | | 3/2019 | Chiang et al. | |
| 2019/0208878 | A1 | | 7/2019 | Hynecek et al. | |

OTHER PUBLICATIONS

CandyShell Grip iPhone 6s Plus Case, posted at speckproducts.com, posting date not given, [online], [site visited Jul. 21, 2017]. Available from Internet, URL: http://www.speckproducts.com/apple/iphonecases/iphone6pluscases/candyshellgripiphone6pluscases/IP6PCSGRIP.html, 7 pages.

Chiang et al., U.S. Appl. No. 29/614,281, filed Aug. 17, 2017, titled "Case for an Electronic Device".

Speck Products CandyShell Grip Case, posted at amazon.com, posting date Sep. 20, 2017, [online], [site visited Jul. 21, 2017]. Available from Internet, URL: https://www.amazon.com/SpeckProductsCandyShellGripiPhone/dp/BOOMV77FOA, 10 pages.

Speck Presidio Show Case sold by Amazon.com at least as early as Oct. 13, 2017. [online], [retrieved on Mar. 9, 2021]. Retrieved from the internet <URL:«https://www.amazon.com/Speck-Products-Presidio-iPhone-Clear/dp/B074JB61RT/ref=sr_1_1?dchild=1&keywords=presidio%2Bshow%2Bopaque&qid=1611253256&sr=8-1&th=1».

Speck Presidio Clear Case sold by Amazon.com at least as early as Dec. 11, 2017. [online], [retrieved on Mar. 8, 2021]. Retrieved from the internet <URL:«https://www.amazon.com/Speck-iPhone-Presidio-Clear-Case/dp/B074GM7QQW/ref=sr_1_6?dchild=1&keywords=speck+presidio+clear&qid=1611692305&sr=8-6> ».

Speck Presidio Perfect Clear Case sold by Amazon.com at least as early as Dec. 10, 2020. [online], [retrieved on Mar. 8, 2021]. Retrieved from the internet <URL:«https://www.amazon.com/Speck-Products-Presidio-Perfect-Clear-iPhone/dp/B08DKTM8PN/ref=sr_1_2?dchild=1&keywords=speck+presidio+clear&qid=1611692305&sr=8-2>».

Gear4 Picadilly Clear Case sold by Amazon.com at least as early as Jul. 23, 2018. [online], [retrieved on Mar. 8, 2021]. Retrieved from the internet <URL:< <https://www.amazon.com/Gear4-Piccadilly-Advanced-Protection-Protected/dp/B06Y4KT4MR/ref=sr_1_6?dchild=1&keywords=gear4%2Bpiccadilly%2BCLEAR%2BCASE%2BWITH%2BADVANCED%2BIMPACT%2BPROTECTION%2BROSE%2BGOLD&qid=1615188338&sr=8-6&th=1>>>.

Android headlines, "Speck Announces Its Case Lineup for the Galaxy S20 Series" Feb. 12, 2020. [online], [retrieved on Mar. 8, 2021]. Retrieved from the internet <URL:«https://www.androidheadlines.com/2020/02/galaxy-s20-series-speck-cases.html»>.

Talk Android, "When It Comes To Protecting Your New Galaxy S20, Galaxy S20+, Or Galaxy S20 Ultra, Speck Has Got You Covered," Feb. 14, 2020. [online], [retrieved on Mar. 8, 2021]. Retrieved from the internet <URL: «https://www.talkandroid.com/guides/buyers-guides/speck-galaxy-s20-plus-ultra-case/»>.

Speck Presidio Perfect Clear sold by Walmart.com at least as early as Mar. 17, 2020. [online], [retrieved on Mar. 9, 2021]. Retrieved from the internet <URL:«https://www.walmart.com/ip/Speck-1363715085-Galaxy-S20-Presidio-Perfect-Clear/216610741»>.

* cited by examiner

*Primary Examiner* — Darlington Ly
(74) *Attorney, Agent, or Firm* — Lerner, David, Littenberg, Krumholz & Mentlik, LLP

(57) CLAIM

The ornamental design for a case for an electronic device, as shown and described.

DESCRIPTION

*This application is an application for reissue of Design U.S. Pat. No. D. 816,651, which issued on May 1, 2018, from U.S. Design patent application Ser. No. 29/568,692, filed on Jun. 16, 2016, the entire disclosure of which is incorporated herein by reference.*

FIG. 1 is [an upper side] *a top plan* view of [the] *a* case *for an electronic device showing our new design* in accordance with a first embodiment [of the invention].

FIG. 2 is a rear *elevation* view [of the case in accordance with a first embodiment of the invention.] *thereof;*

FIG. 3 is a right side *elevation* view [of the case in accordance with a first embodiment of the invention.] *thereof;*

FIG. 4 is a left side *elevation* view [of the case in accordance with a first embodiment of the invention.] *thereof;*

FIG. 5 is a [lower side] bottom *plan* view [of the case in accordance with a first embodiment of the invention.] *thereof;*

FIG. 6 is a front *elevation* view [of the case in accordance with a first embodiment of the invention.] *thereof;*

FIG. 7 is a front-right perspective view [of the case in accordance with a first embodiment of the invention.] *thereof;*

FIG. 8 is a front *cross-sectional* view [cutaway of the case in accordance with a first embodiment of the invention.] *thereof, as taken along line 8-8 in FIG. 1;*

FIG. 9 is [an upper side] *a top plan* view of [the] *a* case *for an electronic device showing our new design* in accordance with a second embodiment [of the invention].

FIG. 10 is a rear *elevation* view [of the case in accordance with a second embodiment of the invention.] *thereof;*

FIG. 11 is a right side *elevation* view [of the case in accordance with a second embodiment of the invention.] *thereof;*

FIG. 12 is a left side *elevation* view [of the case in accordance with a second embodiment of the invention.] *thereof;*

FIG. 13 is a [lower side] bottom *plan* view [of the case in accordance with a second embodiment of the invention.] *thereof;*

FIG. 14 is a front *elevation* view [of the case in accordance with a second embodiment of the invention.] *thereof;*

FIG. 15 is a front-right perspective view [of the case in accordance with a second embodiment of the invention.] *thereof; and,*

FIG. 16 is a front *cross-sectional* view [cutaway of the case in accordance with a second embodiment of the invention.] *thereof, as taken along line 16-16 in FIG. 9.*

The broken lines shown in the figures are for the purpose of illustrating [structure] *portions of the case for an electronic device* that forms no part of the claimed design.

1 Claim, 10 Drawing Sheets

Matter enclosed in heavy brackets [ ] appears in the original patent but forms no part of this reissue; matter printed in italics indicates the additions made by reissue.

Fig. 1
(AMENDED)
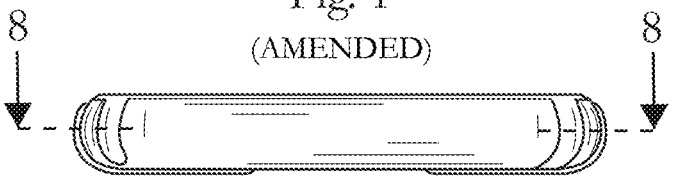
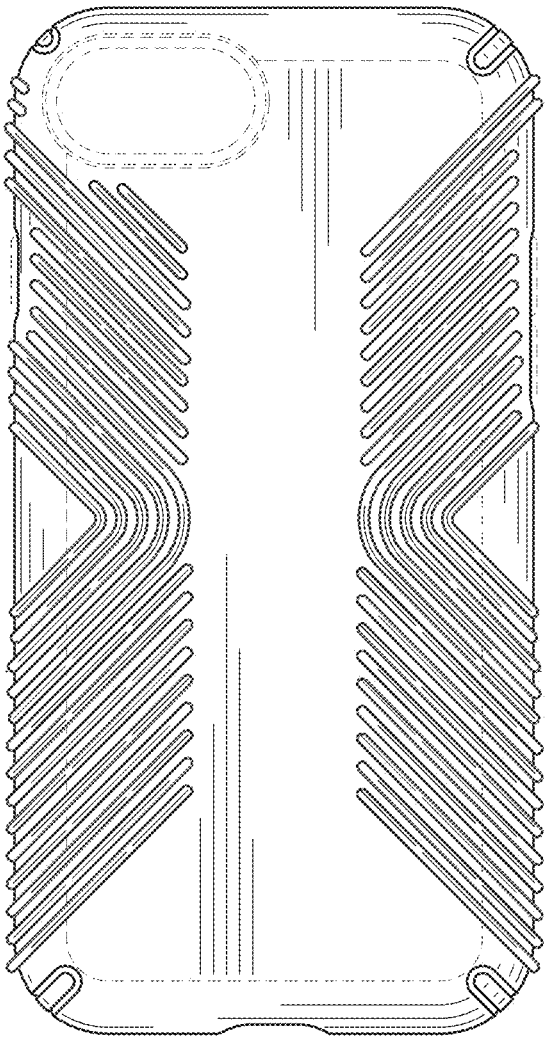
Fig. 2
(AMENDED)

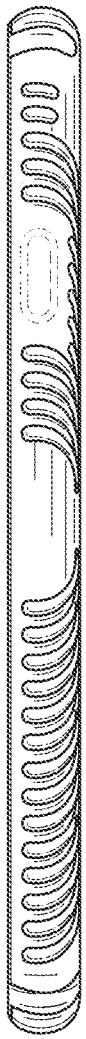
Fig. 3
(AMENDED)
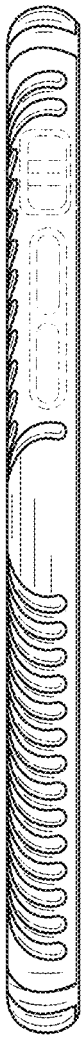
Fig. 4
(AMENDED)
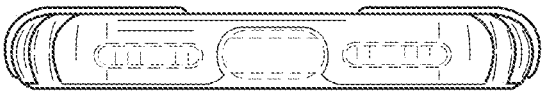
Fig. 5
(AMENDED)

Fig. 6
(AMENDED)
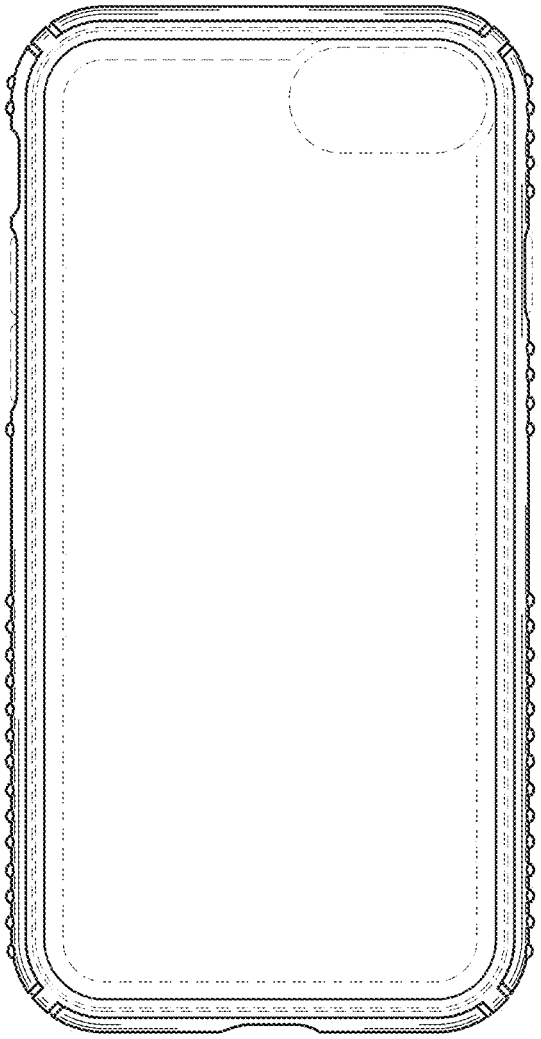

Fig. 7
(AMENDED)
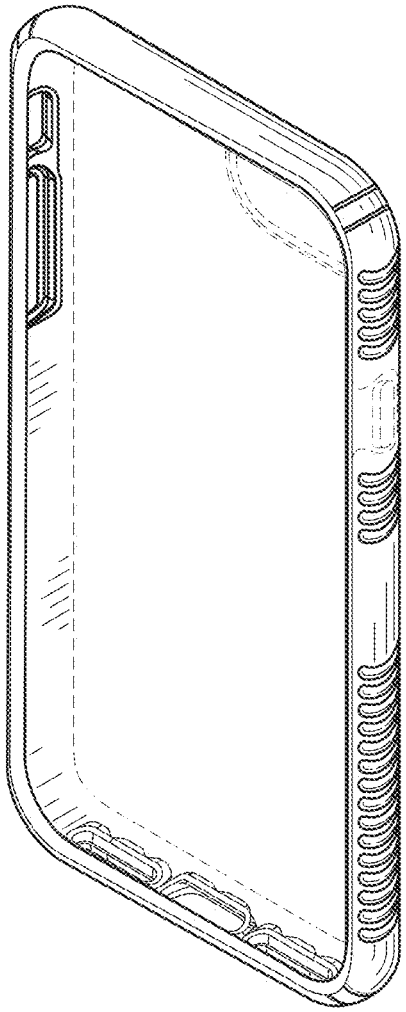

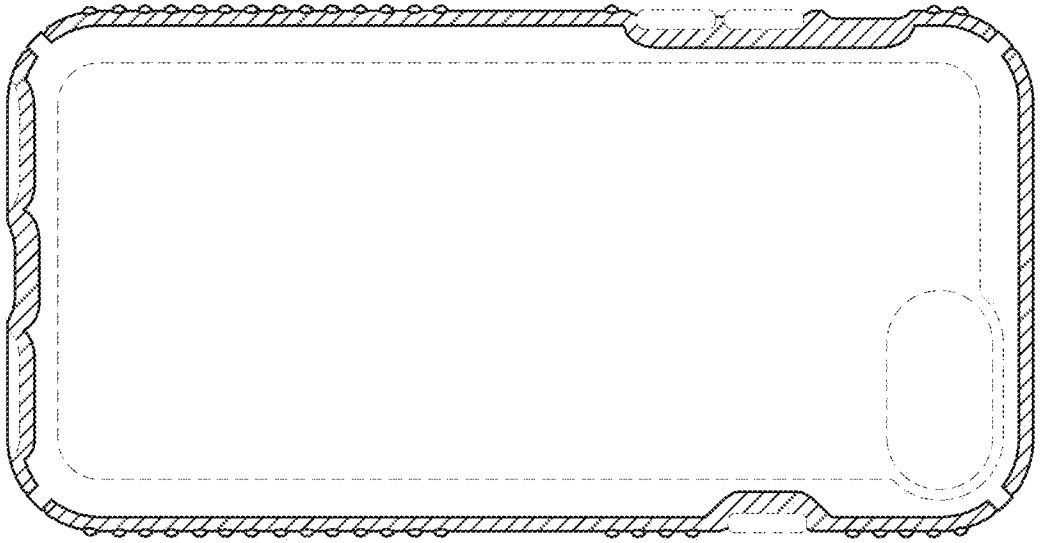
Fig. 8
(AMENDED)

Fig. 9
(AMENDED)
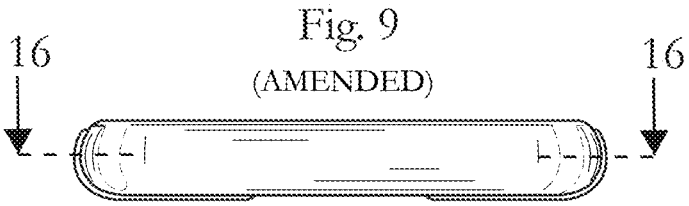
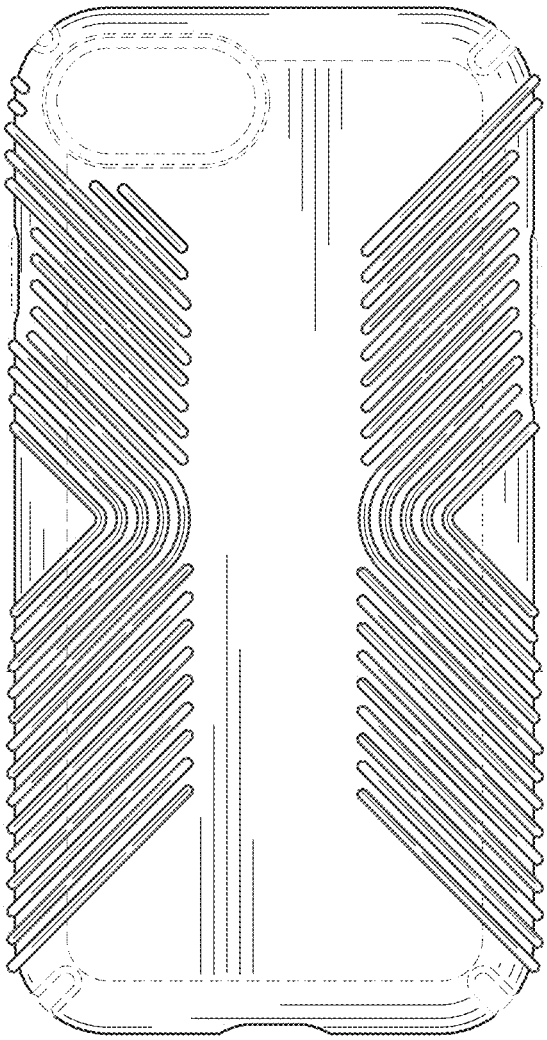
Fig. 10
(AMENDED)

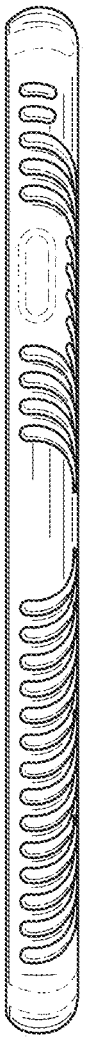
Fig. 11
(AMENDED)
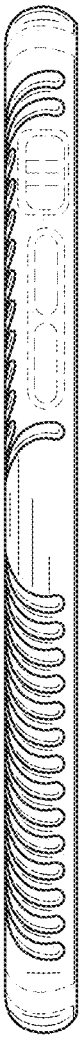
Fig. 12
(AMENDED)
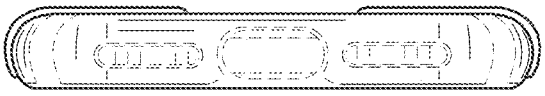
Fig. 13
(AMENDED)

Fig. 14
(AMENDED)
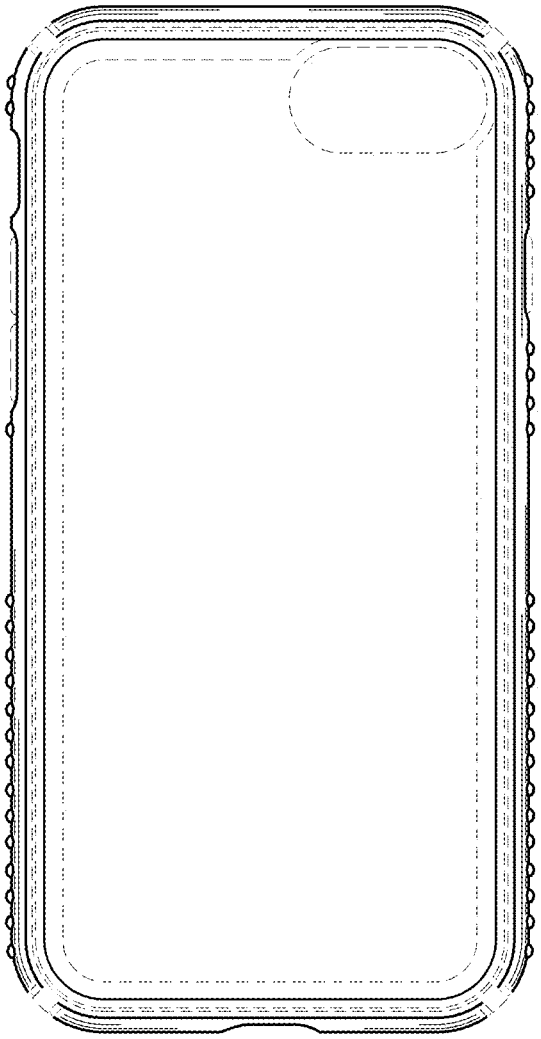

Fig. 15
(AMENDED)
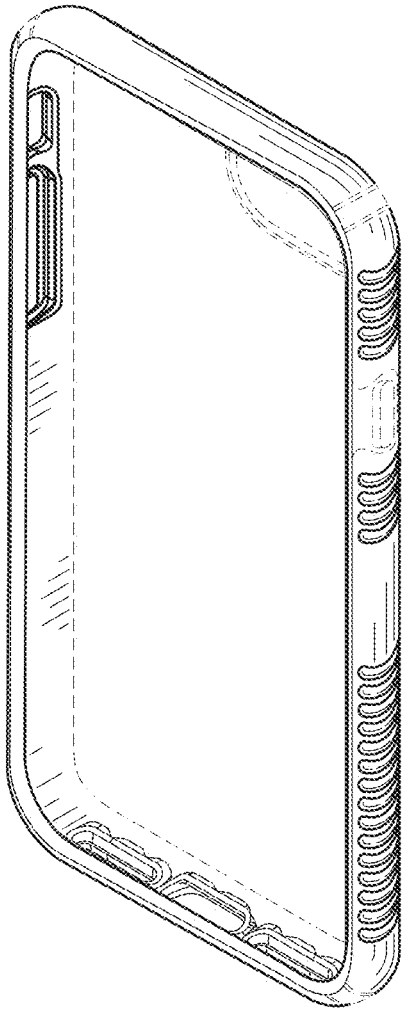

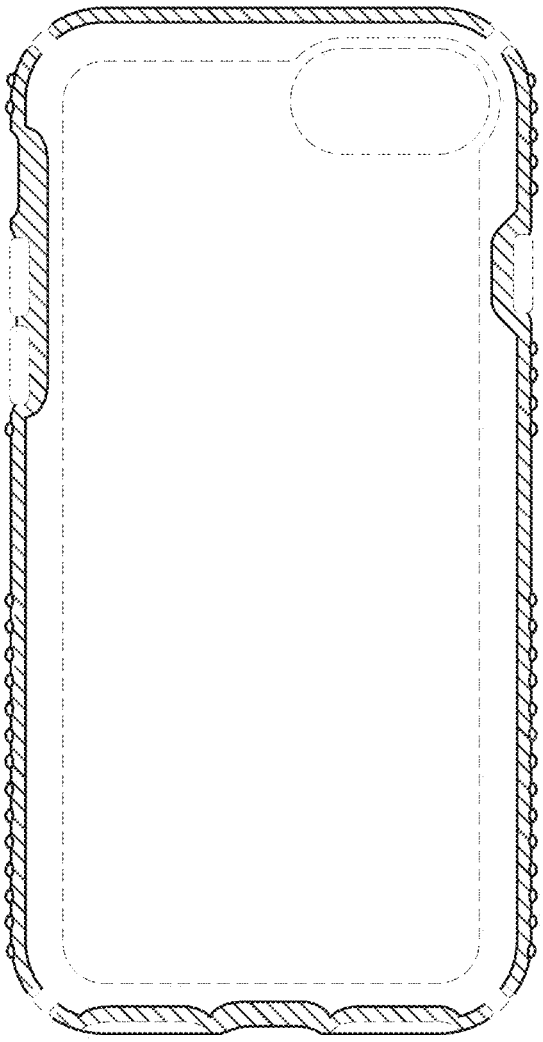
Fig. 16
(AMENDED)